(12) United States Patent
Sahoo et al.

(10) Patent No.: US 10,942,874 B2
(45) Date of Patent: Mar. 9, 2021

(54) METHODS AND SYSTEMS THAT MANAGE FETCHING OF COMMANDS BY A CONTROLLER FROM QUEUES OF A HOST

(71) Applicant: SAMSUNG ELECTRONICS CO., LTD., Suwon-si (KR)

(72) Inventors: Rajesh Kumar Sahoo, Karnataka (IN); Aishwarya Ravichandran, Karnataka (IN); Manoj Thapliyal, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/250,412

(22) Filed: Jan. 17, 2019

(65) Prior Publication Data

US 2019/0303309 A1   Oct. 3, 2019

(30) Foreign Application Priority Data

Mar. 27, 2018   (IN) .............................. 201841011307

(51) Int. Cl.
| | |
|---|---|
| *G06F 13/16* | (2006.01) |
| *G06F 13/18* | (2006.01) |
| *H04L 12/861* | (2013.01) |
| *H04L 12/865* | (2013.01) |
| *H04L 12/863* | (2013.01) |

(52) U.S. Cl.
CPC .......... *G06F 13/1642* (2013.01); *G06F 13/18* (2013.01); *H04L 47/6215* (2013.01); *H04L 47/6275* (2013.01); *H04L 49/90* (2013.01)

(58) Field of Classification Search
CPC ..................................................... G06F 9/3004
See application file for complete search history.

(56) References Cited

U.S. PATENT DOCUMENTS

| | | | |
|---|---|---|---|
| 6,549,983 B1 * | 4/2003 | Han ................... | G06F 12/0802 711/120 |
| 7,701,949 B1 * | 4/2010 | Rose .................... | H04L 47/245 370/229 |
| 7,761,875 B2 | 7/2010 | Karamanolis et al. | |
| 8,392,633 B2 | 3/2013 | Gulati et al. | |
| 9,208,116 B2 | 12/2015 | Sokol, Jr. et al. | |
| 2005/0066138 A1 | 3/2005 | Horn et al. | |
| 2011/0246688 A1 | 10/2011 | Vaz et al. | |
| 2015/0067291 A1 | 3/2015 | Miyamoto et al. | |
| 2016/0117119 A1 | 4/2016 | Kim | |
| 2016/0188510 A1 | 6/2016 | Singh et al. | |
| 2017/0090753 A1 * | 3/2017 | Benisty ................... | G06F 3/061 |

\* cited by examiner

*Primary Examiner* — Henry Tsai
*Assistant Examiner* — Juanito Borromeo
(74) *Attorney, Agent, or Firm* — Volentine, Whitt & Francos, PLLC

(57) ABSTRACT

A method and system for managing command fetches by an Non-Volatile Memory express (NVMe) controller from a plurality of queues in a host maintains a predefined ratio of data throughput, based on the command fetches, between the plurality of queues. Each of the plurality of queues is assigned with a particular priority and weight.

17 Claims, 6 Drawing Sheets

METHODS AND SYSTEMS THAT MANAGE FETCHING OF COMMANDS BY A CONTROLLER FROM QUEUES OF A HOST

CROSS-REFERENCE TO RELATED APPLICATION

A claim for priority under 35 U.S.C. § 119 is made to Indian Patent Application No. 2018-41011307, filed on Mar. 27, 2018, in the Indian Patent Office, the entire contents of which are hereby incorporated by reference.

BACKGROUND

The present inventive concepts herein relate to Peripheral Component Interconnect Express (PCIe) based storage devices, and more particularly to Non-Volatile Memory express (NVMe) controllers that manage command fetching from a host.

An entity, which is able to interact with a controller by sending commands as per NVMe specification, can be characterized as a host. The NVMe or Non-Volatile Memory Host Controller Interface Specification (NVMHCI) is a logical device interface specification for accessing non-volatile storage media attached through a PCIe bus. The NVMe controller within a storage device may manage fetching of commands from a plurality of queues within the host.

SUMMARY

Embodiments of the inventive concepts provide methods and systems that manage fetching of commands by an NVMe controller in a storage device from a plurality of queues in a host.

Embodiments of the inventive concepts provide methods and systems that maintain a predefined ratio of command fetches, based on data throughput, between a plurality of queues, each of the queues being assigned with a particular priority and weight.

Embodiments of the inventive concepts provide a method of managing fetching of commands from a host by a controller of a storage device. The method includes categorizing, by an arbitrator of the storage device, each of a plurality of queues of the host into priority classes associated with respective weights, wherein the priority classes include a first priority class, a second priority class and a third priority class; determining, by a throughput tracker of the storage device, data throughput, based on command fetches of the plurality of queues categorized in each of the first priority class, the second priority class and the third priority class, wherein the data throughput based on the command fetches is based on an amount of data in page size units transferred from the plurality of queues categorized in each of the first priority class, the second priority class and the third priority class, to the storage device; and fetching, by the throughout tracker, commands from the plurality of queues based on determination of whether the data throughput, based on the command fetches of the plurality of queues categorized in the first priority class, the second priority class and the third priority class, is equal to a predefined ratio of data throughput based on the command fetches of the plurality of queues categorized in the first priority class, the second priority class, and the third priority class.

Embodiments of the inventive concepts further provide a storage device including an arbitrator that categorizes each of a plurality of queues of a host into priority classes associated with respective weights, wherein the priority classes include a first priority class, a second priority class and a third priority class; and a controller that processes commands from the host. The controller includes a throughout tracker that determines data throughput, based on command fetches of the plurality of queues categorized in each of the first priority class, the second priority class and the third priority class, wherein the data throughput based on the command fetches is based on an amount of data in page size units transferred from the plurality of queues categorized in each of the first priority class, the second priority class and the third priority class, to the storage device, and fetching commands from the plurality of queues based on determination of whether the data throughput, based on the command fetches of the plurality of queues categorized in the first priority class, the second priority class and the third priority class, is equal to a predefined ratio of data throughput based on the command fetches of the plurality of queues categorized in the first priority class, the second priority class, and the third priority class.

Embodiments of the inventive concepts still further provide a storage device including an arbitrator that categorizes each of a plurality of queues of a host into a first priority class, a second priority class and a third priority class; and a Non-Volatile Memory express (NVMe) controller that determines data throughput, based on command fetches of the plurality of queues categorized in each of the first priority class, the second priority class and the third priority class based on an amount of data in page size units transferred from the plurality of queues categorized in each of the first priority class, the second priority class and the third priority class to the storage device, fetches commands from the plurality of queues based on determination of whether the data throughput, based on the command fetches of the plurality of queues categorized in the first priority class, the second priority class and the third priority class, is equal to a predefined ratio of data throughput based on the command fetches of the plurality of queues categorized in the first priority class, the second priority class, and the third priority class.

BRIEF DESCRIPTION OF THE DRAWINGS

Embodiments of the inventive concepts will be more clearly understood from the following detailed description taken with the accompanying figures, through out which like reference letters indicate corresponding parts unless otherwise specified.

DETAILED DESCRIPTION OF THE EMBODIMENTS

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Embodiments herein disclose methods and systems that manage fetching of commands, by a Non-Volatile Memory express (NVMe) controller in a storage device, from a plurality of queues in a host. Each of the plurality of queues can be categorized in one of a plurality of priority classes. In an example, the priority classes can be a first priority class, a second priority class, and a third priority class. Each of the priority classes can be associated with different weights, wherein the weight increases from the third priority class to the first priority class. A queue categorized in the first priority class (first priority queue) can have the highest weight, and a queue categorized in the third priority class (third priority queue) can have the lowest weight.

Figure 1:
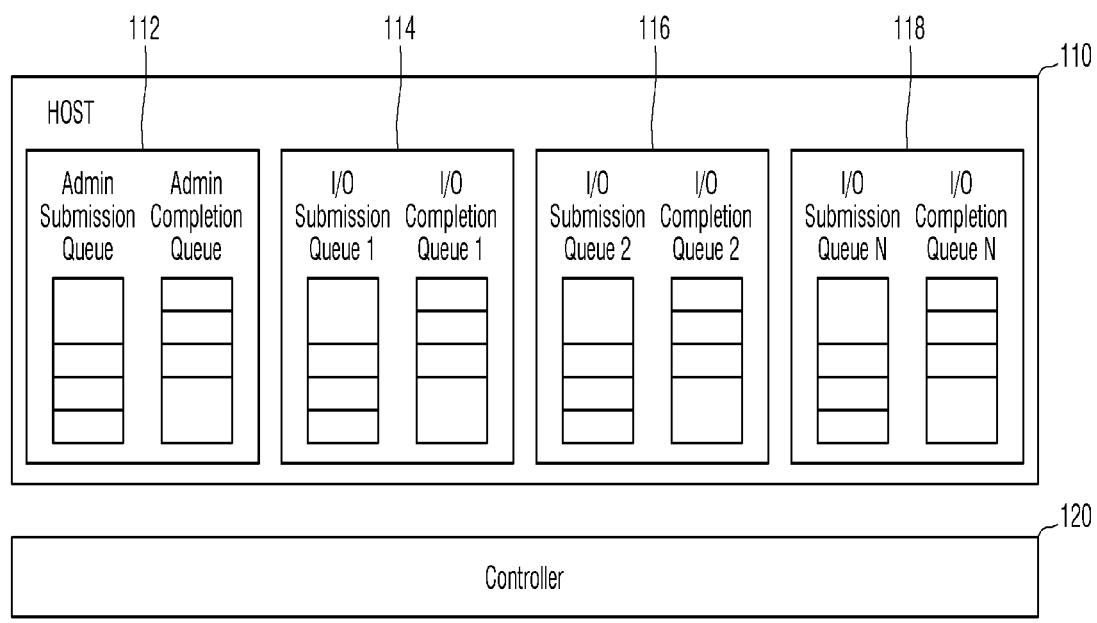
FIG. 1 illustrates an example high level architecture of a host with a plurality of queue pairs and an NVMe controller.

FIG. 1 illustrates an example high level architecture of a host 110 with a plurality of queue pairs and an NVMe controller 120. For example, host 110 includes a plurality of queue pairs 112, 114, 116 and 118 each including submission and completion queues. Queue pair 112 is an administration (admin) queue pair, and queue pairs 114, 116 and 118 are each input/output (I/O) queue pairs. The queue pairs however are not limited to the admin and I/O queue pairs as shown.

NVMe is a scalable host controller interface, which is designed to address the needs of enterprise and client systems. As depicted in FIG. 1, a plurality of interfaces (i.e., the admin or I/O queues) may exist for the transmission of data between the host 110 and the NVMe controller 120 (i.e., storage device controller).

Figure 2:
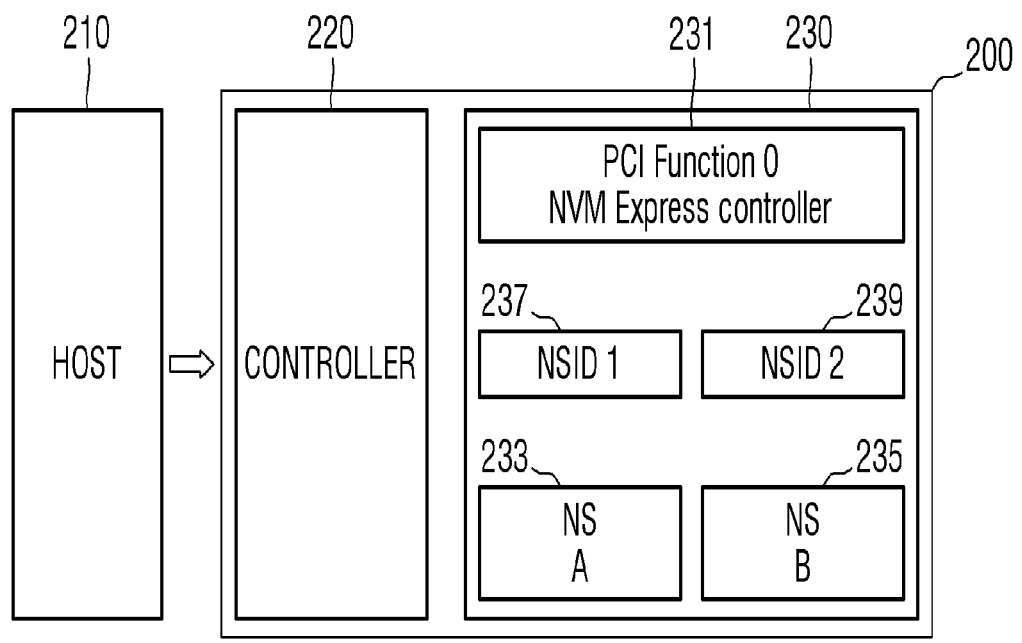
FIG. 2 illustrates a further example high level architecture of a host and a storage device including an NVMe controller associated with a PCIe function.

FIG. 2 illustrates a further example high level architecture of a host 210 and a storage device 200 including an NVMe controller 220 associated with a PCIe function 231 of an NVMe subsystem 230. The NVMe controller 220 is associated with the PCIe function 231 that can process commands from the host 210 and can send an appropriate response to the host 210, as per the NVMe specification. In an example, an NVMe subsystem 230 can include a single PCIe port (not shown) and multiple namespaces NS A 233 and NS B 235 having respective namespace identifiers (ID) NSID 1 237 and NSID 2 239. The host 210 may implement multiple queues for processing I/O commands based on their priority, and associate different queues with different host applications. In such a scenario, the PCIe SSD needs to implement methods for ensuring fairness in order to cater to the requests from different queues, based on priority.

Figure 3:
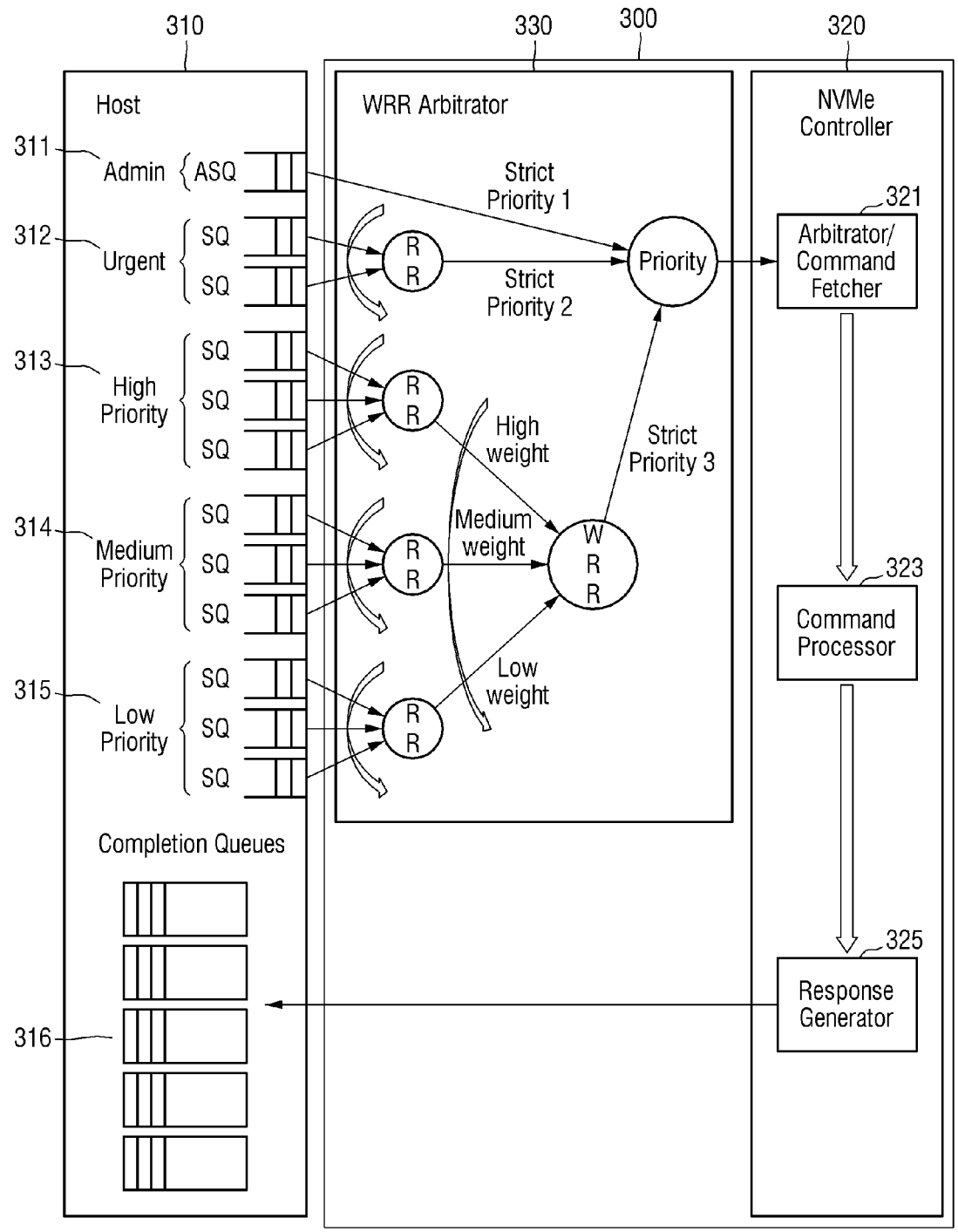
FIG. 3 illustrates a host and a storage device including a weighted round robin (WRR) arbitrator and an NVMe controller that maintains fairness in fetching requests, for processing commands, from different queues in the host.

FIG. 3 illustrates a host 310 and a storage device 300 including a weighted round robin (WRR) arbitrator 330 and an NVMe controller 320 that maintains fairness in fetching requests, for processing commands, from different queues in the host 310. Each queue within the host 310 from among the different queues is associated with a predefined priority. The predefined priorities as shown include low priority, medium priority, and high priority. The queues SQ are thus categorized by the WRR arbitrator 330 into one of these priorities, i.e., high priority queues 313, medium priority queues 314, and low priority queues 315. Within WRR arbitrator 330, an RR arbitration is used for managing command fetches between the high priority queues, an RR arbitration is used for managing command fetches between the medium priority queues, and an RR arbitration is used for managing command fetches between the low priority queues. Each priority is associated with a weight in the WRR arbitrator 330, which increases from low priority to high priority (e.g., low weight, medium weight and high weight). A WRR arbitration within WRR arbitrator 330 ensures that the number of commands processed from the queues, categorized in different priorities, is in a predefined ratio of the weights. The weights may for example be assigned using a set feature command.

Host 310 includes additional categories of queues, namely admin queue(s) (ASQ) 311 and urgent queues 312, which are associated with an infinite weight. If a command arrives into a queue categorized as admin queue or urgent queue, then the command is immediately fetched. In general, there may be a single queue categorized as admin queue 311 and a plurality of queues categorized as urgent queues 312. An RR arbitration of WRR arbitrator 330 as shown in FIG. 3 is used for managing command fetches between the urgent queues. Host 310 also includes completion queues 316.

The NVMe controller 320 includes an arbitrator/command fetcher 321 that is configured to fetch a corresponding command from the WRR arbitrator 330, a command processor 323 for performing the corresponding command fetched by the arbitrator/command fetcher 321, and a response generator 325 that generates and sends a response to the completion queues 316 in the host 310.

In FIG. 3, the WRR arbitrator 330 does not take size of the commands from the queues into consideration, which may result in a disproportionate ratio of throughput. For example, if the high priority queues 313 have commands with size of 4 KB and the low priority queues 315 have commands with size of 128 KB, with a weight ratio of 4:1 respectively, the throughput for low priority queues 315 would be higher compared to high priority queues 313.

Figure 4:
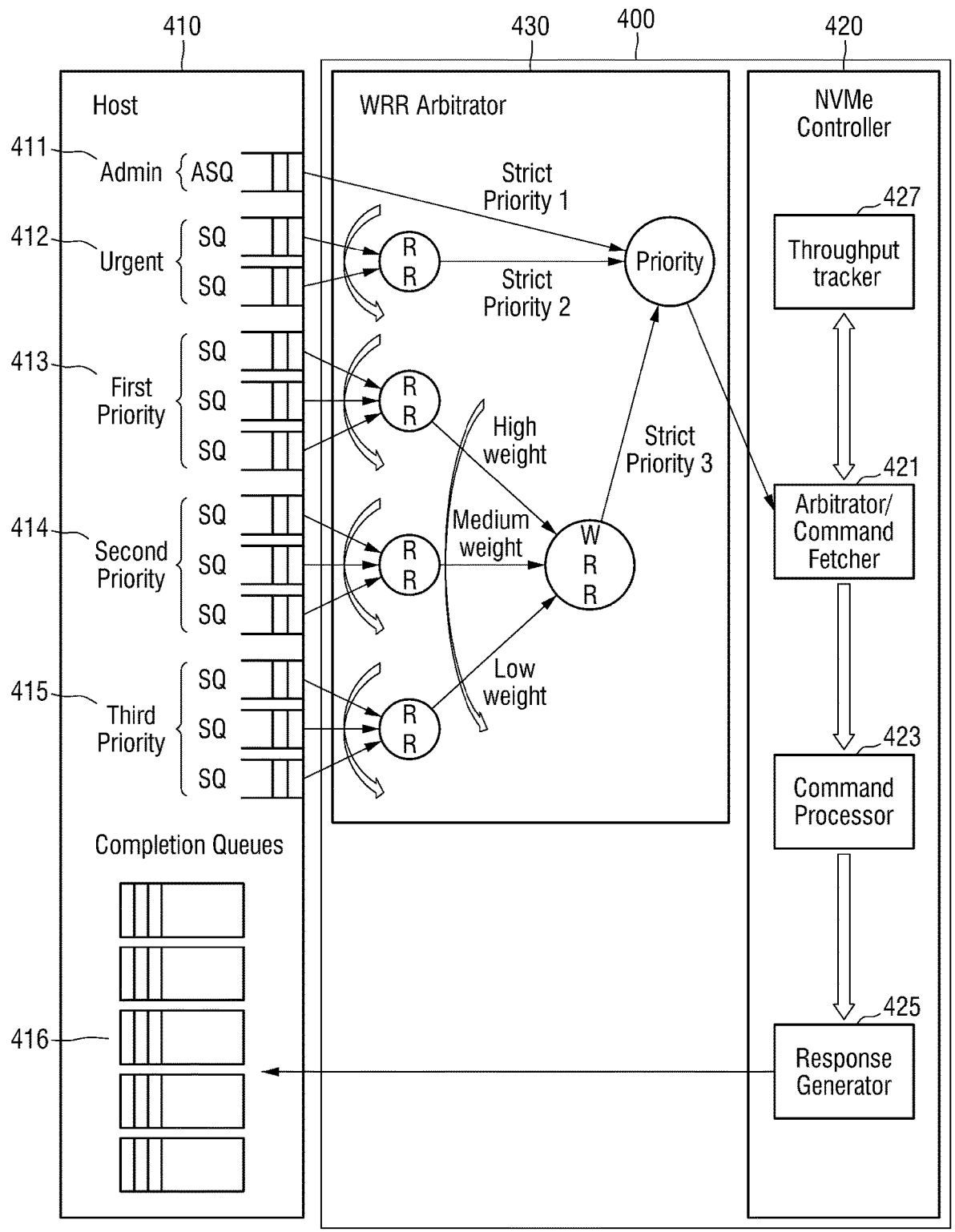
FIG. 4 illustrates a host and a storage device including a WRR arbitrator and an NVMe controller having a data throughput tracker that maintains fairness in fetching requests, for processing commands, from different queues in a host, according to embodiments of the inventive concepts.

FIG. 4 illustrates a host 410 and a storage device 400 including a WRR arbitrator 430 and an NVMe controller 420 having a data throughput tracker 427 that maintains fairness in fetching requests, for processing commands, from different queues in host 410, according to embodiments of the inventive concepts.

In FIG. 4, parts that are similar to parts in FIG. 3 respectively include similar reference numerals, and for the sake of brevity, detailed description of such similar parts may be omitted from the following. For example, in FIG. 4 host 410 includes admin queue(s) 411, urgent queues 412, first (high) priority queues 413, second (medium) priority queues 414, third (low) priority queues 415 and completion queues 416 that are configured and function similar to respective queues 311, 312, 313, 314, 315 and 316 in FIG. 3. WW arbitrator 430 in FIG. 4 includes RR arbitrations and WRR arbitration similarly as described with respect to FIG. 3. NVMe controller 420 in FIG. 4 includes arbitrator/command fetcher 421, command processor 423 and response generator 425 that are configured and function respectively similar to arbitrator/command fetcher 321, command processor 323 and response generator 325 as described with respect to FIG. 3.

In the embodiment of FIG. 4, a predefined ratio of data throughput, based on command fetches, is maintained between the queues. For example, a predefined ratio of data throughput, based on command fetches, is maintained between the high priority queues 413 and the low priority queues 415 by throughput tracker 427 in the NVMe controller 420.

FIG. 4 depicts an example of throughput aware WRR arbitration that maintains fairness in fetching requests, for processing commands, from different queues in a host. In the embodiment of FIG. 4, the throughput tracker 427 is disposed in NVMe controller 420. However, in other embodiments, the throughput tracker 427 may be disposed in a storage device controller.

The host 410 includes a plurality of queues, which are categorized by WRR arbitrator 430 into one of the priority classes, i.e., admin class, urgent class, first priority class, second priority class and third priority class. Each queue may be categorized in one of the above mentioned priority classes. The different queues categorized in the different priority classes are associated with different weights. The queues categorized in the first priority class, i.e., first priority queues 413, can be associated with a highest weight. The queues categorized in the second priority class, i.e., second priority queues 414, can be associated with a medium weight. The queues categorized in the third priority class, i.e., third priority queues 415, can be associated with a lowest weight. In general, infinite weight is associated with the queues categorized in the admin class (i.e., admin queues 411) and the urgent class (i.e., urgent queues 412).

In the example depicted in FIG. 4, a single queue is categorized in the admin class, two queues are categorized in the urgent class, and three queues each are categorized in the first priority class, the second priority class, and the third priority class respectively. The queues categorized in the admin class and the urgent class are associated with infinite weight. The commands arriving in the admin queue 411 and the urgent queues 412 are immediately processed.

Since there are two urgent queues 412 (as depicted in FIG. 4, two queues are categorized in the priority urgent class), fairness in fetching of commands from the two urgent queues are ensured based on an RR arbitration of WRR arbitrator 430. The fetching of commands from the first priority queues 413, the second priority queues 414 and the third priority queues 415 are ensured using a throughput aware WRR arbitration mechanism. The throughput aware WRR arbitration mechanism considers the command fetch based on data throughput, of the first priority queues 413, the second priority queues 414 and the third priority queues 415. The throughput tracker 427 tracks the data throughput, based on command fetches, i.e., amount of data, in page size unit, transferred from the host 410 to the NVMe controller 420 (responsive to a Write Command) or from NVMe controller 420 to host 410 (responsive to a Read Command), while fetching commands from each of the different queues.

The throughput tracker 427 ensures that the data throughput, based on command fetches, of the first priority queues 413, the second priority queues 414 and the third priority queues 415 are in a predefined ratio. The fairness in fetching of commands from the queues categorized in the same priority class can be ensured based on WRR arbitrator 430.

In order to maintain the predefined ratio of data throughput, based on command fetches, in turn based on the WRR arbitrator 430, the throughput tracker unit 427 disables or enables fetching of commands from queues associated with lower weights. If the predefined ratio is not maintained due to lack of command fetches from queues associated with higher weight, then the throughput tracker unit 427 enables or disables fetching of commands from the queues associated with lower weights. If the predefined ratio is not maintained due to lack of command fetches from queues associated with lower weights, then the throughput tracker unit 427 does not perform any specific action.

Figure 5:
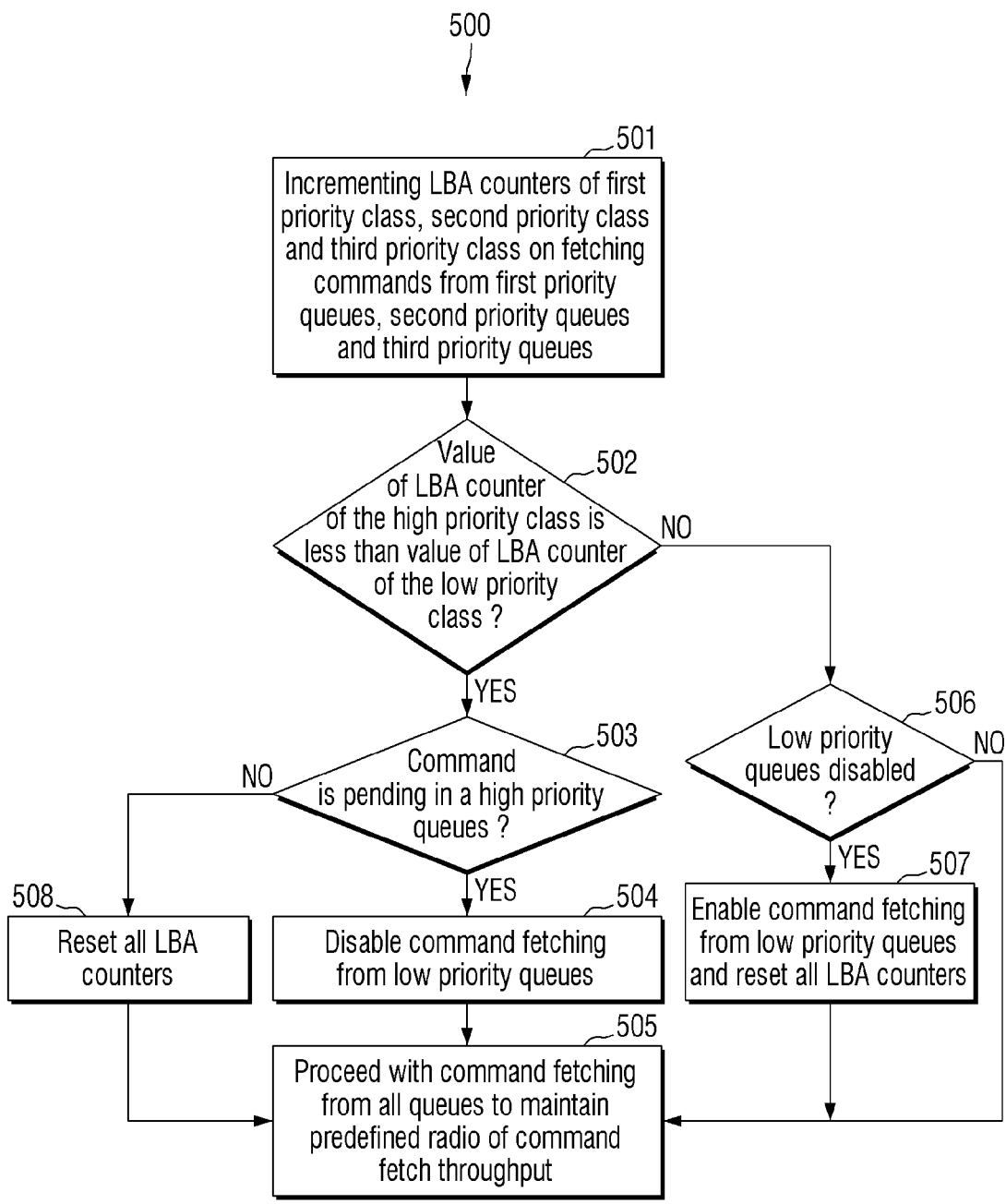
FIG. 5 illustrates a flowchart of a method of managing fetching of commands by the NVMe controller of FIG. 4 from a plurality of queues in a host, according to embodiments of the inventive concepts.

FIG. 5 illustrates a flowchart 500 of a method of managing fetching of commands by the NVMe controller 420 of FIG. 4 from a plurality of queues in host 410, according to embodiments of the inventive concepts. The description of the flowchart is based on the example scenario depicted in FIG. 4. The method includes initializing logical block address (LBA) counters for the first priority class, second priority class and third priority class. The counter of a particular priority class is incremented when the amount of data, in page size unit, transferred from the queues, categorized in that particular class, to the NVMe controller 420 is equal to a logical block of a predefined size. In an embodiment, the LBA counters may be disposed in throughput tracker 427, and in other embodiments the LBA counters may be disposed in NVMe controller 420 outside of the throughput tracker 427.

The method includes updating the weight of a particular priority class when a set feature command with feature ID 01h is received (e.g., from the host 410). For example, the updating of the weight of the particular priority class may be performed by the WRR arbitrator 430 within the storage device 400 shown in FIG. 4. Thus, the priority class, with which a particular queue may be categorized, can be changed using the set feature command. The method includes maintaining a lookup table for determining whether the data throughput, based on command fetches, of the first priority queues 413, the second priority queues 414, and the third priority queues 415 is in the predefined ratio. The lookup table tracks the status of the LBA counters of the first priority class, the second priority class and the third priority class. As discussed, since, the respective LBA counters are incremented with transfer from data from the respective queues in the host 410 to the NVMe controller 420, the throughput tracker 427 can track whether the predefined ratio is maintained. The lookup table can be updated using create I/O or delete I/O commands In an embodiment, the lookup table may be maintained in throughput tracker 427, and in other embodiments the lookup table may be maintained in NVMe controller 420 outside of the throughput tracker 427.

At operation 501 in FIG. 5, the NVMe controller 420 increments the respective LBA counters of the first priority class, the second priority class and the third priority class, when a command is fetched from the respective first priority queues 413, the second priority queues 414 and the third priority queues 415. The throughput tracker 427 checks if the sizes of the fetched commands are within a specified limit, in order to maintain the predefined ratio of the data throughput, based on the commands fetched, between the first priority queues 413, the second priority queues 414 and the third priority queues 415.

At operation 502, the NVMe controller 420 determines whether a value of an LBA counter of a priority class associated with a higher weight (high priority class) is less than a value of an LBA counter of a priority class associated with a lower weight (low priority class). The scenarios can include for example one of the value of the LBA counter of the third priority class being higher than the values of the LBA counters of the first priority class and the second priority class respectively, and the value of the LBA counter of the second priority class being higher than the values of the LBA counter of the first priority class, among other possibilities. In all of these scenarios where the value of the LBA counter of the high priority class is less than a value of the LBA counter of a low priority counter, the predefined ratio is not maintained as there are more commands, pending to be processed, in the queues categorized in the first priority class (first priority queues) and the second priority class (second priority queues) in comparison with the queues categorized in the third priority class (third priority queues).

When the NVMe controller 420 determines that the value of the LBA counter of the high priority class is less than a value of the LBA counter of the low priority class (YES at operation 502, the NVMe controller 420 determines at operation 503 whether at least one command is pending in the queues categorized in the priority class associated with the higher weight (high priority queues). If at least one command is pending in the higher priority queues (YES at operation 503), then the NVMe controller 420 disables command fetching from queues categorized in the priority class associated with the lower weight (low priority queues) in operation 504. Thereafter, at operation 505, the NVMe controller 420 proceeds with command processing from the queues, categorized in different priority classes, such that the data throughput based on command fetches, between the different queues becomes the predefined ratio. As a result, it can be expected that the throughput of the high priority queues increase. This ensures that the predefined ratio of data throughput, based on command fetches, is maintained. The LBA counters of all priority classes are then reset to prevent the scenario of counter overflow.

When the NVMe controller 420 determines that the value of the LBA counter of the high priority class is more than a value of the LBA counter of the low priority class (NO at operation 502), the NVMe controller 420 at step 506 determines whether the low priority queues are disabled. If it is determined that the low priority queues are disabled (YES at operation 506), then the NVMe controller 420 at operation 507 enables command fetching from the low priority queues. In this scenario, the predefined ratio was not maintained, as the throughput of the low priority queues was less than required to maintain the predefined ratio. Thus, enabling command fetching from the low priority queues allows the predefined ratio of data throughput to be achieved, based on command fetches.

On the other hand, when the NVMe controller 420 determines that the low priority queues are not disabled (NO at operation 506) then the NVMe controller 420 at operation 505 proceeds with command processing from the queues, categorized in different priority classes, such that the data throughput, based on command fetches, between the different queues becomes the predefined ratio.

When the NVMe controller 420 determines that no commands in the high priority queues are pending (NO at operation 503), then the NVMe controller 420 at step 508 resets the LBA counters of all the priority classes. In this scenario, the predefined ratio may not be maintained due to the fact that the data throughput, based on command fetches, from the high priority queues is less than required to maintain the predefined ratio. However, the cause is lack of arrival of commands from the queues categorized in the high priority class. The lack of arrival of commands from the high priority queues can be ascertained by checking a head pointer and a tail pointer of the high priority queues. If the head pointers and the tail pointers are equal, then it can be concluded that the high priority queues are empty.

Thereafter, the NVMe controller 420 at step 505 proceeds with command processing from the queues, categorized in different priority classes, such that the data throughput, based on command fetches, between the different queues, categorized in the different priority classes, is maintained at the predefined ratio.

The various operations in method 500 may be performed in the order presented, in a different order or simultaneously. Further, in some embodiments, some operations of FIG. 5 may be omitted.

Figure 6:
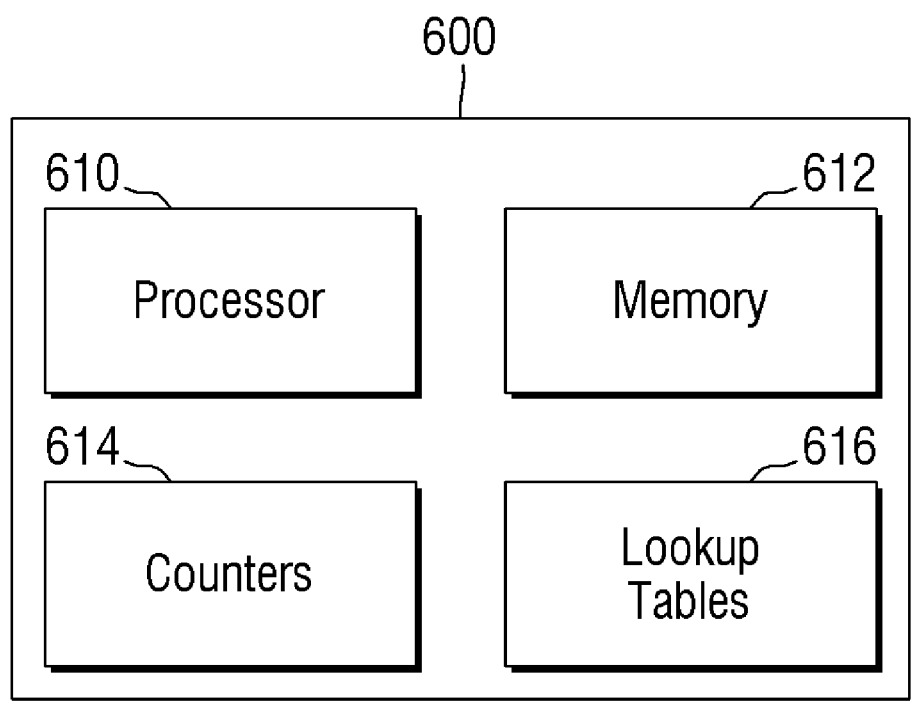
FIG. 6 illustrates an example of a throughput tracker of FIG. 4, according to embodiments of the inventive concepts.

FIG. 6 illustrates an example of a throughput tracker of FIG. 4, according to embodiments of the inventive concepts. Throughput tracker 600 shown in FIG. 6 includes processor 610, memory 612, counters 614 and lookup tables 616. The processor 610 may for example be configured to carry out various operations responsive to programming stored in memory 612. For example, the processor 610 may perform operations such as previously described to maintain the predefined ratio of data throughput between the high priority queues and the low priority queues based on command fetches. For example, the processor 610 may track data throughput based on the command fetches. The processor 610 may provide control to disable or enable fetching of commands from queues of a corresponding class. The processor may for example control incrementing and initializing of the counters 614. The counters 614 may include for example first counters, second counters and third counters respectively corresponding to a first priority class, a second priority class and a third priority class. The processor may also maintain (e.g., update) the lookup tables 616 responsive to the create I/O or delete I/O commands for example. The throughput tracker 600 however should not be limited to the components shown in FIG. 6, but in other embodiments may include other components and/or may exclude some of the components as shown.

The embodiments disclosed herein, such as the operations described with respect to FIG. 5 for example, may be implemented through at least one software program running on at least one hardware device and performing network management functions to control the network elements shown in FIG. 4. The network elements shown in FIG. 4 include blocks, which can be at least one of a hardware device, or a combination of hardware device and software module.

The embodiments disclosed herein describe methods and systems that manage fetching of commands, from a plurality of queues in a host, by an NVMe controller in a storage device. However, it should be understood that the inventive concepts may be applied to a program, and in addition to a non-transitory computer readable medium containing program code for implementation of one or more steps of the method, when the program or program code runs on a server or mobile device or any suitable programmable device. The method may be implemented in an embodiment through or together with a software program written in for example Very high speed integrated circuit Hardware Description Language (VHDL), another programming language, or implemented by one or more VHDL or several software modules executed on at least one hardware device. The hardware device may be any kind of portable device that can be programmed. The device may also include for example hardware such as for example an ASIC, or a combination of hardware and software, an ASIC and an FPGA, or at least one microprocessor and at least one memory with software modules located therein. The embodiments described herein may be implemented partly in hardware and partly in software. Alternatively, the inventive concepts may be implemented on different hardware devices, for example using a plurality of CPUs.

The foregoing description of the specific embodiments will so fully reveal the general nature of the embodiments herein that others can, by applying current knowledge, readily modify and/or adapt for various applications such specific embodiments without departing from the inventive concepts, and, therefore, such adaptations and modifications should and are intended to be included within the disclosed embodiments. For example, although embodiments of the inventive concepts have been described with reference to an NVMe controller, the inventive concepts may be applied to storage controllers that interface with a host according to any variety of different communication protocols such as for example universal serial bus (USB), serial AT attachment (SATA), small computer system interface (SCSI), serial attached SCSI (SAS) and universal flash storage (UFS), among other various communication protocols. It should be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method executed by a controller of a storage device for fetching commands from high-priority queues and low-priority queues of a host, the method comprising:
    incrementing a first count in response to each instance of transferring an amount of data equivalent to a logical block of a predetermined size between the high-priority queues and the storage device;
    incrementing a second count in response to each instance of transferring the amount of data equivalent to the logical block between the low-priority queues and the storage device;
    prioritizing the fetching of the commands from the high-priority queues and low-priority queues based on the first count and the second count; and
    fetching the commands from the high-priority queues and the low-priority queues in accordance with the prioritization, wherein
    the fetching the commands is disabled when data throughput of a plurality of queues categorized in the high-priority queues and the low-priority queues is not equal to a predefined ratio of data throughput based on the command fetches of the plurality of queues categorized in the high-priority queues and the low-priority queues.

2. The method of claim 1, further comprising determining whether the second count exceeds the first count.

3. The method of claim 2, further comprising:
    in response to determining the second count exceeds the first count, determining whether the high-priority queues have a command pending; and
    in response to determining the high-priority queues have a command pending, assigning priority to fetching a command from the high-priority queues.

4. The method of claim 2, further comprising:
    in response to determining the second count does not exceed the first count, determining whether priority has been assigned to fetching a command from the high-priority queues; and
    in response to determining priority has been assigned to fetching a command from the high-priority queues, eliminating the priority assigned to fetching the command from the high-priority queues.

5. The method of claim 2, further comprising:
    in response to determining the second count exceeds the first count, determining whether the high-priority queues have a command pending; and
    in response to determining the high-priority queues do not have a command pending, setting each of the first count and the second count to a same value.

6. The method of claim 1, wherein the controller comprises a Non-Volatile Memory express (NVMe) controller that processes the commands from the host.

7. A storage device comprising:
    an arbitrator that categorizes a first group of queues of a host as high-priority queues and a second group of queues of the host as low-priority queues; and
    a controller that manages fetching of commands from the host by:
        incrementing a first count in response to each instance of transferring an amount of data equivalent to a logical block of a predetermined size between the high-priority queues and the storage device,
        incrementing a second count in response to each instance of transferring the amount of data equivalent to the logical block between the low-priority queues and the storage device,
        prioritizing the fetching of the commands from the high-priority queues and low-priority queues based on the first count and the second count, and
        fetching the commands from the high-priority queues and the low-priority queues in accordance with the prioritization, wherein
    the fetching is disabled when data throughput of a plurality of queues categorized in the high-priority queues and the low-priority queues is not equal to a predefined ratio of data throughput based on the command fetches of the plurality of queues categorized in the high-priority queues and the low-priority queues.

8. The storage device of claim 7, wherein the controller further processes commands fetched from the host by determining whether the second count exceeds the first count.

9. The storage device of claim 8, wherein the controller further processes commands fetched from the host by:
    determining, in response to determining the second count exceeds the first count, whether the high-priority queues have a command pending; and
    assigning, in response to determining the high-priority queues have a command pending, priority to fetching a command from the high-priority queues.

10. The storage device of claim 8, wherein the controller further processes commands fetched from the host by:
    determining, in response to determining the second count does not exceed the first count, whether priority has been assigned to fetching a command from the high-priority queues; and
    eliminating, in response to determining priority has been assigned to fetching a command from the high-priority queues, the priority assigned to fetching the command from the high-priority queues.

11. The storage device of claim 8, wherein the controller further processes commands fetched from the host by:
determining, in response to determining the second count exceeds the first count, whether the high-priority queues have a command pending; and
setting, in response to determining the high-priority queues do not have a command pending, each of the first count and the second count to a same value.

12. The storage device of claim 7, wherein the controller comprises a Non-Volatile Memory express (NVMe) controller.

13. A storage device comprising:
an arbitrator that categorizes a first group of queues of a host as high-priority queues and a second group of queues of the host as low-priority queues; and
a Non-Volatile memory express (NVMe) controller that manages fetching of commands from the host by:
incrementing a first count in response to each instance of transferring an amount of data equivalent to a logical block of a predetermined size between the high-priority queues and the storage device,
incrementing a second count in response to each instance of transferring the amount of data equivalent to the logical block between the low-priority queues and the storage device,
prioritizing the fetching of the commands from the high-priority queues and low-priority queues based on the first count and the second count, and
fetching the commands from the high-priority queues and the low-priority queues in accordance with the prioritization, wherein
the fetching is disabled when data throughput of a plurality of queues categorized in the high-priority queues and the low-priority queues is not equal to a predefined ratio of data throughput based on the command fetches of the plurality of queues categorized in the high-priority queues and the low-priority queues.

14. The storage device of claim 13, wherein the NVMe controller further processes commands fetched from the host by determining whether the second count exceeds the first count.

15. The storage device of claim 14, wherein the NVMe controller further processes commands fetched from the host by:
determining, in response to determining the second count exceeds the first count, whether the high-priority queues have a command pending; and
assigning, in response to determining the high-priority queues have a command pending, priority to fetching a command from the high-priority queues.

16. The storage device of claim 14, wherein the NVMe controller further processes commands fetched from the host by:
determining, in response to determining the second count does not exceed the first count, whether priority has been assigned to fetching a command from the high-priority queues; and
eliminating, in response to determining priority has been assigned to fetching a command from the high-priority queues, the priority assigned to fetching the command from the high-priority queues.

17. The storage device of claim 14, wherein the NVMe controller further processes commands fetched from the host by:
determining, in response to determining the second count exceeds the first count, whether the high-priority queues have a command pending; and
setting, in response to determining the high-priority queues do not have a command pending, each of the first count and the second count to a same value.

* * * * *